Feb. 12, 1929.　　　　　　　　　　　　　　　　　1,702,071
R. F. BROWN
HOSE RACK
Filed Oct. 2, 1922　　　　2 Sheets-Sheet 1
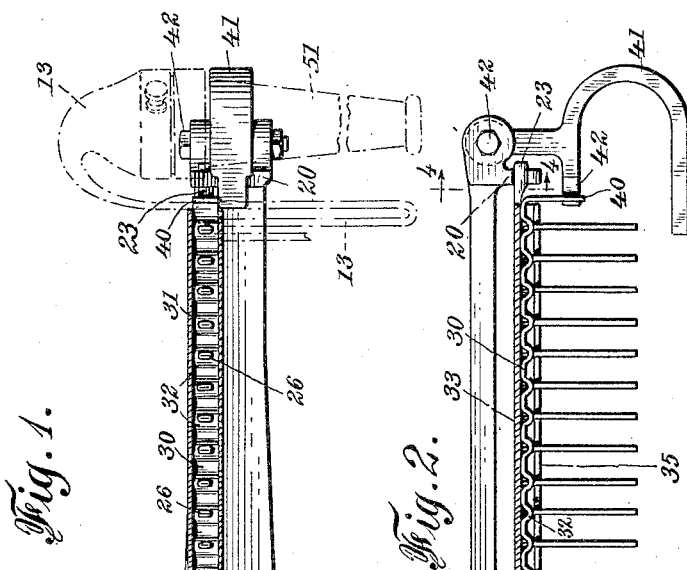
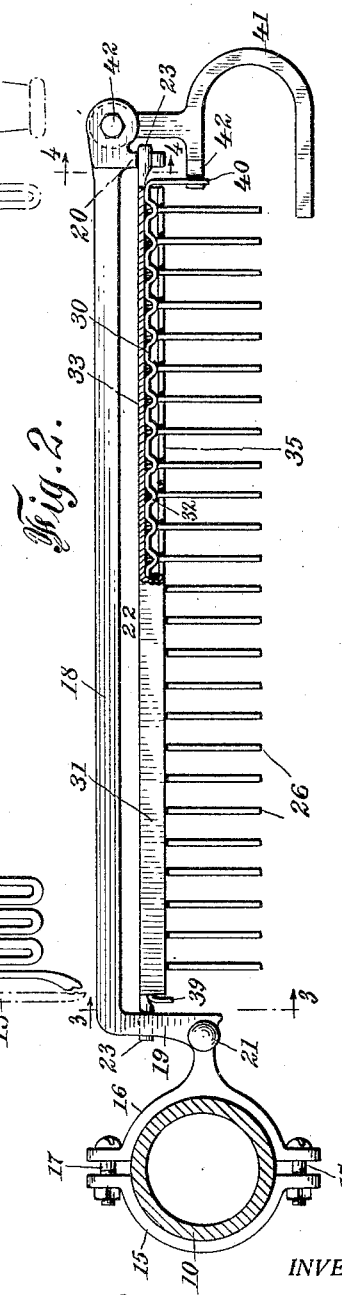
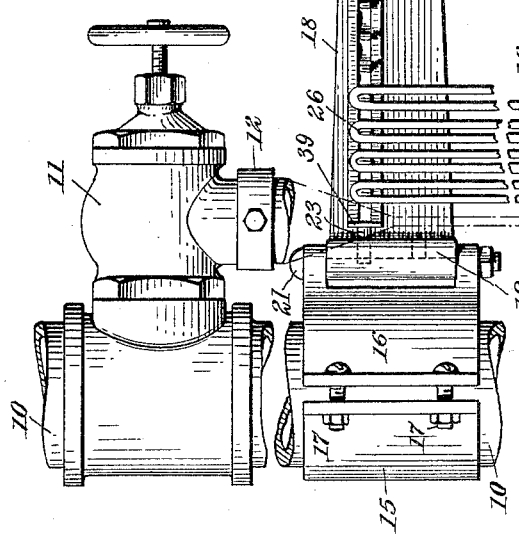
INVENTOR
Raymond F. Brown
BY
Conrad A. Winter
his ATTORNEY

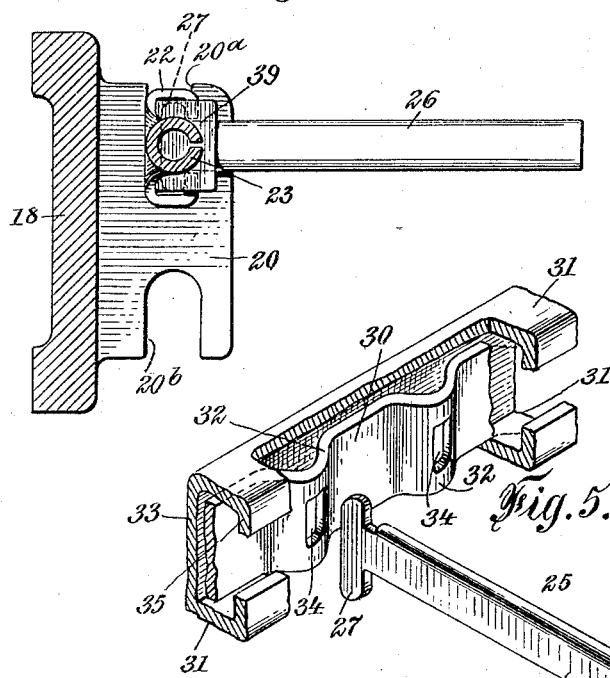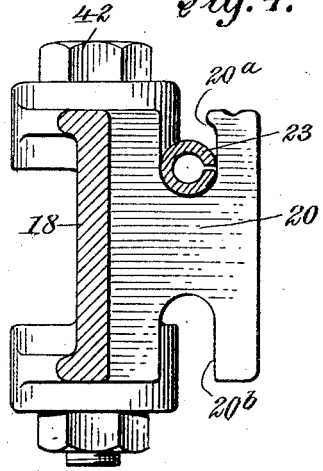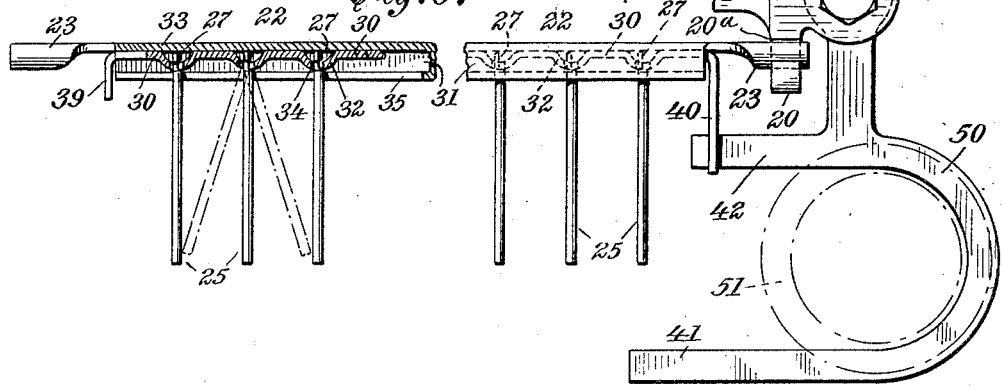

Patented Feb. 12, 1929.

1,702,071

UNITED STATES PATENT OFFICE.

RAYMOND F. BROWN, OF NEW YORK, N. Y.

HOSE RACK.

Application filed October 2, 1922. Serial No. 591,762.

My invention relates to improvements in hose-racks of the type employed for supporting a length of fire-hose in folded or looped form in convenient position so that it may be readily released or unfolded and laid for immediate use when required.

One object of my invention is the provision of a supporting member of the character above indicated which comprises few and simple parts, which is not liable to get out of order, from which the hose may be instantly and completely detached without danger of becoming entangled, and upon which the hose may be easily, conveniently and compactly supported in position for instant use.

A further object of said invention is the provision of a supporting member of the character above indicated which comprises a flat member, such as a channel bar, formed with journals at its ends capable of operating in bearings whereby to cause the hose-rack to support the hose normally in position thereon, and to permit of the partial rotation of the rack to discharge the hose therefrom.

A further object of said invention is the provision of a supporting member having a plurality of supporting bars or rods upon which the folds of the looped hose are supported, and in which said bars are so mounted within said member as to permit of the movement of the bars relative to said member in order to facilitate the arranging of the hose thereon or the removal of the same from the rack.

When the rods are fixedly connected to the supporting member it is necessary to draw the hose off the rods substantially parallel to the axes of said rods. In rapidly removing the hose, however, it frequently happens that force is applied so as to draw the hose off at an angle to said axes, which results in wedging or binding of the hose. This invention provides a pivotal connection between the supporting member and each of the rods, whereby the latter yield in the direction of the applied force and thus facilitate the removal of the hose.

A further object of this invention is to provide in connection with the supporting member means whereby a plurality of independent supporting rods may be readily and efficiently mounted in said member for pivotal movement, and held therein without possibility of accidental displacement.

A further object of this invention is the provision of a supporting member, supporting rods and means for mounting said rods in said member, all of which may be easily and inexpensively cast or stamped from sheet metal.

A further object of said invention is the provision of a hose-rack having a supporting member arranged in offset relation to the securing means therefor whereby the weight of the rack and of the hose thereon will be disposed equally on both sides of a line extending substantially centrally of said supporting member and coinciding with the point of securement therefor.

Other objects and advantages will in part be obvious, and in part be pointed out in the specification.

To the attainment of the aforesaid objects and ends, my invention consists in the novel details of construction, and in the combination, connection and arrangement of parts hereinafter more fully described and then pointed out in the claims.

Referring to the drawings wherein I have shown what I now consider to be the preferred form of my invention, Figure 1 is a front elevation, partly broken away and in section of a hose-rack embodying my invention;

Fig. 2 is a plan or top view partly in section of the hose-rack shown in Fig. 1;

Fig. 3 is a section taken on the line 3—3 of Fig. 2;

Fig. 4 is a section taken on the line 4—4 of Fig. 2;

Fig. 5 is a perspective showing a portion of a supporting member, a portion of a retaining member therein, and a supporting rod detached from said retaining member;

Fig. 6 is a top or plan view, partly in section, of a portion of the hose-rack, and showing the means for holding the hose-supporting member in normal position.

In said drawings, the hose-rack is illustrated as applied to a stand-pipe 10, such as is usually found in buildings and other structures for fire-extinguishing purposes, and which serves as a convenient support for the hose rack. It will be understood that any other suitable support may be employed. The stand-pipe is provided with a suitable valve 11 which receives the coupling 12 of a length of fire-hose 13.

The hose-rack may be mounted on the stand-pipe or other support preferably by means of a split-collar, the sections 15, 16 of which may be fastened together by bolts 17. On one of the sections (here shown as the section 16) there is pivotally mounted at 21 a supporting bracket 18 having off-set ends 19 and 20. Within said ends is journaled a supporting member 22. The said member 22 is preferably made in the form of a channel-bar which may be cast but is preferably stamped out of sheet metal, and has its ends rounded to form trunnions or journals 23 which operate in bearings formed in the off-set ends 19 and 20.

Upon the supporting member are mounted a plurality of supporting rods or bars 25, each of which may be cast or preferably stamped out of sheet metal to form a stem portion 26 and an angular end portion forming a pivot 27. The rods 25 are mounted within the channel member by a retaining or confining member 30 rigidly held between the upper and lower flanges 31 of said channel member 22. At predetermined intervals throughout its length the retaining member 30 is provided with substantially semi-circular bends or corrugations 32 extending outwardly from the wall 33 of the channel member. A slot or aperture 34 is formed in each bend or corrugation 32 of such size as will permit of the passage therethrough of the stem 26 of the rods. Each pivot 27 is duly confined between its respective bend or corrugation 32 of the retaining member 30 and the rear wall 33 of the channel member 22. It will be understood that the rods are inserted in position in the retaining member before the latter is inserted into the channel member, so that when said retaining member is properly positioned within said channel member all of the rods will be held firmly against accidental displacement but be free to oscillate about their pivots 27, as axes within the bends or corrugations 32.

To secure the retaining member 30 in position within the channel member 22, the ends 39, 40 of said retaining member 22 which project beyond the ends of said channel member are bent outwardly at substantially right angles and engages the ends of the inwardly extending flanges 35 of said channel member. The end 40 is longer than the end 39 in order to engage with a latch or locking device 41 hereinafter described.

The rack is normally sustained in horizontal or other raised position, by any suitable latch such as a member 41 hingedly supported upon the bracket 18 for pivotal movement in a horizontal plane just below the rack when the latter is in the desired raised position. The member 41 is provided with a finger 42 adapted to engage beneath some portion of the hose rack, such as the angular projecting end portion 40 at one end of the retaining member, in order to support the entire hose-rack in elevated, preferably substantially horizontal position. When the member 41 is swung outwardly, however, the finger 42 is released of its engagement with the end projection 40 of the rack, and the latter by its own weight rotates downwardly and causes the hose to be discharged from the rods or pins 26. The member 41 may be provided with a circular supporting portion 50 to receive and support the hose nozzle 51 as shown in dotted lines in Figs. 1 and 6 so that when said nozzle is drawn outwardly it will serve to disengage the latch 41.

When the hose is released and discharged as described above, due to the disengagement of the latch 41, with end 40, the folds of the hose leave the supporting rods 26. Frequently, however, if the valve 11 is opened before the hose has been discharged, the effect of the water entering the hose is to cause the loops or folds to swell and the hose to become wedged intermediate the pins or rods and hold the same securely in position upon the rack. In such case, according to the present invention, the respective rods or pins 26 will be rotated about their pivots and permit the hose to be drawn off without wedging or binding which might otherwise occur if said pins or rods were fixedly connected to or rigid upon the supporting bar.

Further, it is to be noted that by offsetting the supporting bar 18 with respect to the pivot support 21 thereof, the weight of the rack and of the hose arranged thereon is disposed substantially equally to both sides of a line extending longitudinally centrally of the rack and coinciding with the pivot 21. By this arrangement the rack is not subjected to any undue strain, and a further advantage accrues in that the rack, as a whole, may be disposed in closer proximity to the wall than is possible where the bracket or supporting arm 18 is arranged directly in line with, or in prolongation of the supporting pivot as 21.

The arm 18 is provided at its end 20 with upper and lower bearings $20^a$, $20^b$ (Fig. 4) and at its end 19 with upper and lower socket bearings (Fig. 1) alined with the bearings $20^a$ and $20^b$, respectively, to removably receive the trunnions 23 of the member 31. The two sets of bearings are located at opposite sides of the locking member 41. The entire support 18 may be reversed, as required, to swing to the left or right. The pivoted member 31 upon reversal of the support 18 is located in the set of bearings which permits the member 31 to be operatively engaged by the member 41 to hold the same in raised position. Because of the off-set character of the arm 18 the same may be so secured to the support 16 to swing to the left or right, as required, to position the rods 26 next to the wall and out of the way.

The above description illustrates the principles embodied in my invention but it will be understood that various changes and modifications may be made within the scope of the invention as defined in the annexed claims.

Having thus described my said invention what I claim and desire to secure by Letters Patent is—

1. A hose-rack comprising a support, an angular member including a short arm and a long arm arranged substantially at right angles to said short arm, said member being pivoted at the outer end of said short arm to said support to move about a vertical axis, a member pivoted on said angular member to move about a horizontal axis arranged substantially at right angles to said short arm intermediate said vertical axis and said long arm, supporting rods each attached at one end to said last named member to move vertically therewith and pivoted thereon to move laterally relatively thereto and relatively to each other, the opposite ends of said rods being free and unobstructed, and means for retaining said rods in horizontal positions, substantially as specified.

2. A hose-rack comprising a support, an angular member including a short arm and a long arm arranged substantially at right angles to said short arm, said member being pivoted at the outer end of said short arm to said support to move about a vertical axis, a member pivoted on said angular member to move about a horizontal axis arranged substantially at right angles to said short arm intermediate said vertical axis and said long arm, supporting rods each attached to said last named member to move vertically therewith and pivoted thereon to move laterally relatively thereto and relatively to each other, said rods extending horizontally across a horizontal line intersecting said vertical axis and substantially at right angles to said short arm, the outer ends of said rods being free and unobstructed, and means on the outer end of said long arm and engaging said last named member to retain said rods in horizontal position, substantially as specified.

3. A hose-rack comprising a rod supporting member, a plurality of supporting rods each having a pivot at one end thereof, and a member carried by and cooperating with said supporting member to retain said rods therein; said members jointly forming spaced bearings for receiving said pivots to permit of said rods swinging laterally; and the opposing portions of said bearings serving as stops engageable with said rods to limit the swinging movement thereof, substantially as specified.

4. A hose-rack comprising a rod supporting member, a plurality of supporting rods each having a pivot at one end thereof, and a separate member having apertures therein receiving said rods, and removably interengaging said supporting member for retaining said rods thereon against removal; said members jointly forming spaced bearings for receiving said pivots to permit of said rods swinging laterally, substantially as specified.

5. A hose-rack comprising a bracket, a supporting bar hingedly mounted on said bracket, a plurality of independent supporting rods, means whereby said rods are pivotally connected to said bar, said means comprising a member associated with said bar and having portions spaced therefrom to form bearings, said bearings each having an opening therein, and said rods each having a stem portion and a pivot; said openings being adapted to receive said stem portions, substantially as specified.

6. A hose-rack comprising a bracket, a supporting channel-bar pivotally mounted on said bracket, a plurality of independent supporting rods, a member pivotally connecting said rods to said bar, said member being disposed within said channel-bar and having portions spaced therefrom to form bearings, and said rods each having a pivot operating in one of said bearings, substantially as specified.

7. A hose-rack comprising a bracket, a supporting channel-bar pivotally mounted on said bracket, a member disposed in said channel-bar and having portions spaced therefrom to form bearings, a plurality of independent supporting rods each having a pivot operating in one of said bearings, and said member having its ends disposed at an angle to the body thereof when in position in said channel bar to engage said bar and prevent relative movement thereof with respect to said bar, substantially as specified.

8. A hose rack comprising a bracket, a supporting channel bar pivotally mounted on said bracket, a member disposed in said channel bar and having spaced portions extending therefrom to form bearings, ends extending angularly from said member, a plurality of supporting rods each having a pivot operating in one of said bearings, a locking member adapted to engage with one of the angular ends of said member to hold said channel-bar and associated parts in normally raised position, substantially as specified.

9. A hose-rack comprising a bracket, an arm pivotally mounted thereon, a channel bar pivotally supported upon said arm, a retaining member disposed within said channel bar having its ends bent angularly outwardly therefrom and engaging the ends of said channel bar, said retaining member having a series of vertical corrugations or loops provided with apertures, rods each disposed in one of said apertures, a pivot for each of said rods located within one of said bearings, and a locking member pivotally mounted upon said arm and adapted to engage with one of the angular projecting ends of said retaining member whereby to support the same and the rods thereon in normally raised position, substantially as specified.

10. A hose rack comprising a bracket, an arm having off-set ends, and one of said ends pivotally mounted upon said bracket, bearings in said off-set ends, a channel bar, trunnions at the ends thereof supported in the bearings in said arm, a corrugated member disposed within said channel bar having its ends bent angularly outwardly therefrom and engaging the ends of said channel bar, apertures in said corrugations, rods extending through said apertures, pivots at the inner ends of said rods located within said corrugations, and a pivoted locking member adapted to engage with one of the projecting ends of said corrugated member, whereby to support the same and the rods mounted thereon in normally raised position, substantially as specified.

11. A hose-rack comprising a supporting member, a member pivoted thereon to move about a horizontal axis, a plurality of supporting rods, and a member carried by and cooperating with said pivoted member to retain said rods thereon for vertical movement therewith, said members jointly forming bearings for said rods to permit the same to swing laterally relatively to said pivoted member, substantially as specified.

12. A hose-rack comprising a supporting member, a member pivoted thereon to move about a horizontal axis, a plurality of supporting rods, a member associated with said pivoted member to rigidly retain said rods thereon against movement vertically relatively thereto, and bearings formed by said members jointly to permit said rods to swing laterally relatively thereto, substantially as specified.

13. A hose-rack comprising a support, a member pivoted thereon to move about a horizontal axis, a separate retaining member interengaged with said pivoted member, said members having spaced portions to form bearings, ends extending angularly from said last named member, a plurality of supporting rods retained between said members in said bearings, and means adapted to engage one of said ends of said last named member to hold said rods in raised position, substantially as specified.

14. A rack comprising a channel member, a corrugated member disposed within said channel member and forming therewith a plurality of spaced bearings, said corrugated member having apertures therein at said bearings, a plurality of supporting rods extending through said apertures, and pivots at the inner ends thereof located between said members in said bearings, substantially as specified.

15. A rack comprising a channel member, a plurality of supporting rods, a member secured within said channel member by the flanges thereof and serving to retain said rods in position between said members against vertical movement relative thereto, said member having spaced portions to provide bearings for said rods to permit the same to swing laterally, substantially as specified.

16. A rack comprising a channel member, a member disposed in said channel member, said members having spaced portions forming bearings, and a plurality of supporting rods retained between said members in said bearings, said last named member having its ends disposed at an angle to the body thereof to engage said channel member to be retained therein, substantially as specified.

17. A rack comprising a retaining member, a cooperating retaining member having a plurality of bends therein to form bearings between the same and said first named member, said bends having apertures therein, means associated with said members to retain the same together in interlocked relation, a plurality of supporting rods extending through said apertures, and heads thereon at the inner ends thereof within said bearings to hold the same against vertical movement relative to said members and to permit lateral movement thereof, substantially as specified.

18. A rack comprising a channel member, a plurality of separate supporting rods, and a separate member disposed in said channel member for retaining said rods therein against vertical movement relative thereto, said separate member having ends angularly disposed at the ends of said channel member to retain the same therein.

Signed at the city of New York, in the county and State of New York, this 24th day of August one thousand nine hundred and twenty-two.

RAYMOND F. BROWN.